Figure 1:
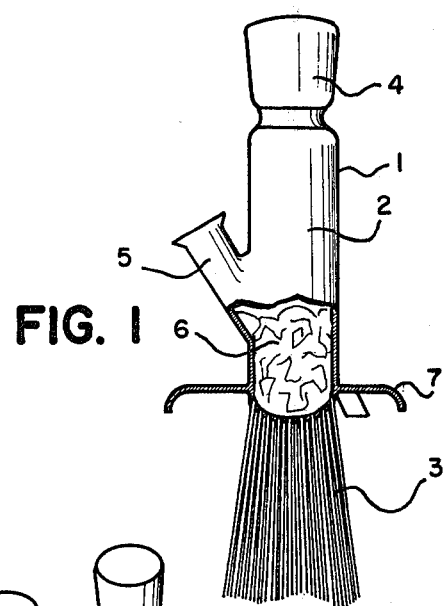

United States Patent [19]
Golz et al.

[11] 4,321,542
[45] Mar. 23, 1982

[54] METHOD AND APPARATUS FOR TESTING CHARGED AND DRY STORABLE LEAD STORAGE BATTERIES

[75] Inventors: Hans-Joachim Golz, Hanover; Uwe Bauck, Garbsen, both of Fed. Rep. of Germany

[73] Assignee: VARTA Batterie Aktiengesellschaft, Hanover, Fed. Rep. of Germany

[21] Appl. No.: 131,025

[22] Filed: Mar. 17, 1980

[30] Foreign Application Priority Data

Apr. 2, 1979 [DE] Fed. Rep. of Germany ....... 2913190

[51] Int. Cl.³ .............................................. G01N 27/42
[52] U.S. Cl. ..................................... 324/426; 324/437
[58] Field of Search ................ 324/425, 426, 437, 434

[56] References Cited
U.S. PATENT DOCUMENTS
3,657,639 4/1972 Willihnganz ........................ 324/437

Primary Examiner—Michael J. Tokar
Attorney, Agent, or Firm—Weiser, Stapler & Spivak

[57] ABSTRACT

The grid frame surfaces of the plate block are bridged in electrolytically conductive manner. As a result of the forming process, these surfaces exhibit sufficient traces of active mass. A brush-like instrument is used, whose bristles are capillaries which communicate through an electrolyte container. In a closed multi-cell battery, each plate block is contacted at its grid frame through the filler opening by the capillaries of an instrument supported above the filler opening. The battery voltage is measured at the terminals. This would otherwise be measurable only after filling with electrolyte.

6 Claims, 2 Drawing Figures

U.S. Patent  Mar. 23, 1982  4,321,542

METHOD AND APPARATUS FOR TESTING CHARGED AND DRY STORABLE LEAD STORAGE BATTERIES

The invention relates to a method of testing for polarity, short-circuit, and open circuit, lead storage batteries which have been charged and are being kept in storage in a dry state.

Heretofore, it has not been considered feasible to perform voltage measurements to determine proper assembly on storage battery cells whose electrode plates have been charged, but which have not yet been filled. The same problem exists, particularly for multi-cell batteries, especially starter batteries which are nowadays put into storage in large quantities in the charged state but without electrolyte, without it having been possible to determine in advance that the correct polarity, the correct sequence of plates, and the absence of short-circuits and other defects has been achieved for each individual battery.

Defects which are in fact present reveal themselves only after the battery has been activated by filling it with electrolyte. They then manifest themselves as a reduction in nominal voltage of 2 volts, 4 volts, etc., if, for example, one or more cells have been installed in reversed position.

Wrong polarities can create such drastic potential reductions that the operation of the electrical system of the automobile becomes unreliable. This danger always exists when the customer fills the battery himself, after purchase, and places it into service within the vehicle without further voltage test, following installation in the vehicle.

Accordingly, it is an object of the present invention to provide a method and means for its practice which are suitable for making charged and dry-storable storage battery cells examinable with respect to their defect-free construction, thereby avoiding the uncertainties described above.

This and other objects which will appear are achieved in accordance with the invention by establishing within the cell an electrolytic bridge which does not detract from the dry storage condition, and then measuring the cell potential.

If the battery is one which consists of several charged and dry-storable cells, then its operating voltage which is developed at the terminals only after being filled with electrolyte becomes inexaminable by treating all the cells simultaneously in accordance with the invention. This involves producing an ion conductive bridge between any two or more electrodes of opposite polarities.

To do this it is necessary only to bring into contact with each other a few discrete locations on the surfaces of one and the other types of electrodes, by means of an electrolyte-moistened material, care being taken that ion conduction within this material is provided over the entire path between the contact points. A discontinuity or interruption of the contact bridge involving a conductor having a different type of conductivity, for example, an electron conductor, must be precluded.

In practice, one could utilize a wick soaked in electrolyte, which is surrounded with an insulating tube except at its extreme ends to prevent acid contamination, and whose ends are attached to the top of the frame of at least two oppositely poled electrodes within the cell. By so doing, it becomes possible to measure the electrochemical potential difference between the electrodes of the two polarities, without imposing any load. This is because, as shown by experiments, the positive frame surface is already covered with $PbO_2$ by having been formed, while the negative mass and its frame consists of lead, and the two frames need to be bridged only in ion-conductive manner, for which a relatively small quantity of electrolyte suffices.

If a charged, dry-storable storage battery is tested in this manner, one observes first that, before the electrolyte bridge has been established, a vacuum tube voltmeter (digital voltmeter) connected between the cell terminals will show a fluctuating voltage when the cell is good. If the cell has a short-circuit, then this voltage remains steadily at zero.

When the electrolyte bridge provided by the wick has become fully established, the cell voltage which is measured when the polarity is correct is a little over 2 volts. If the cell is installed reversed, this can be recognized by a reading of the wrong polarity.

If, for example, all six cells of a starter battery are treated with an electrolyte-soaked material in accordance with the invention, then a good product is indicated by a voltage of a little over 12 volts with correct polarity. If one cell is short-circuited, 10 volts will be measured, for two cells which are short-circuited 8 volts, etc.

If a cell is installed reversed, this cell with its opposing voltage produces an overall potential of 8 volts, for two incorrectly installed cells, the overall voltage is 4 volts, etc.

If, on the other hand, the voltage continues to fluctuate, then an open circuit in the terminals or in the connectors can be considered to be the cause.

Because the storage batteries already have their lids in place when they are dry-stored, the electrolyte-soaked material must be introduced into each cell through the filler opening. It is particularly advantageous to achieve the contacting of the electrode plates of both polarities in this situation by means of a brush-like structure, whose bristles consist of capillaries, the upper ends of which extend into a small electrolyte reservoir, so that all the capillaries communicate with each other.

Figure 2:
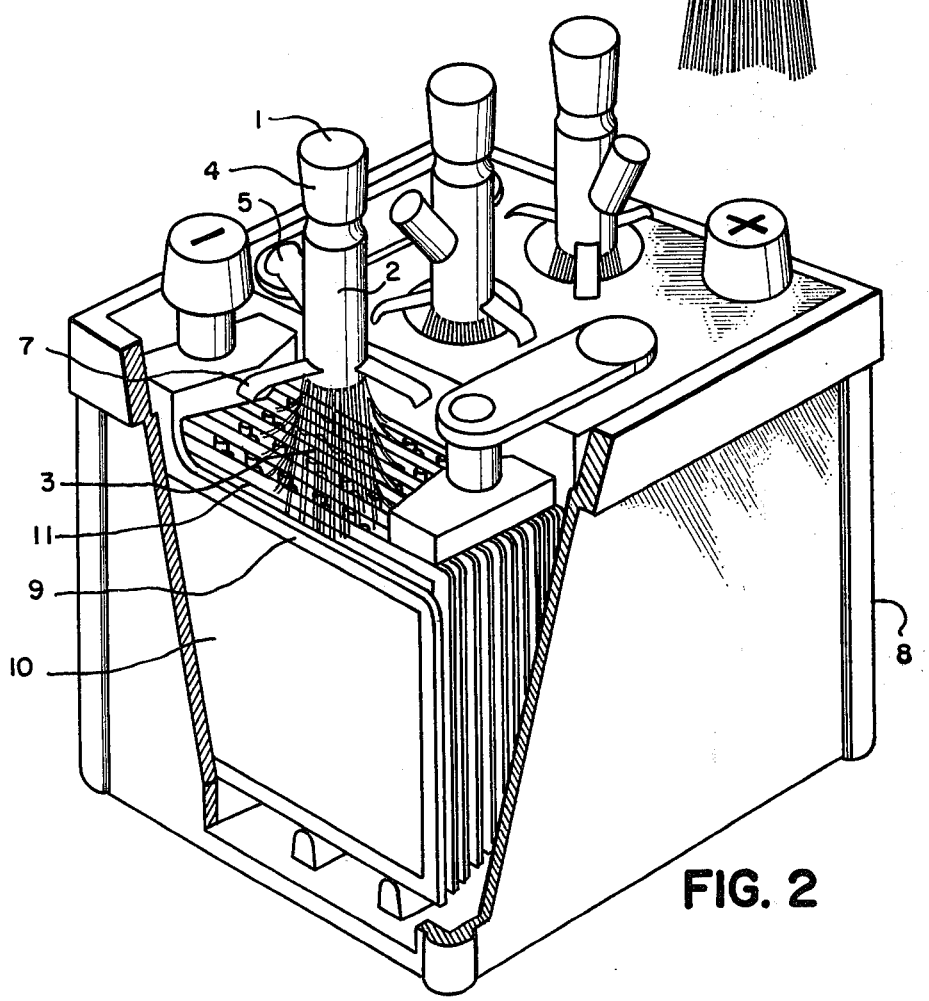

For further details, reference is made to the description which follows in light of the accompanying drawings wherein FIG. 1 shows a brush-like instrument for use in accordance with the present invention, and FIG. 2 shows, partly broken away, a view of a multi-cell battery utilizing the invention.

Referring to FIG. 1, this shows a brush-like structure 1, consisting of a reservoir 2 whose bottom opens into a plurality of downwardly extending capillaries or tubelets 3, a handle 4, and a filler pipe 5 for the ion conductive electrolyte. Reservoir 2 and tubelets 3 are preferably made of an easily shaped, chemically resistant synthetic plastic. Preferably, the electrolyte is substantially fixated by a loose wad 6 of glass wool, or the like. By means of a support 7, the reservoir 2 is positioned above the filler opening in the cell lid.

FIG. 2 shows a three-cell lead storage battery 8, with electrolyte bridges constructed in accordance with the invention, the brush-like structures 1 being used for that purpose.

The broken-away view of the front cell shows how the tubelets 3 spread out with their tips over the plate block. In so doing, they bear against the top-most surfaces of the grid frames, for example, against frame 9 of the outermost negative electrode 10. In the same manner, all the other positive and negative electrodes in the middle of the plate block are reached via their grid frames between ribbed separators 11. In so doing, direct contact with the active electrode masses is not required, because even the surface characteristics of the grid frame as modified by forming suffice to electrochemically indicate the state of the charged lead storage battery. Due to the multiplicity of tubelets 3, substantially uniform electrolytic connection to the entire plate block is provided.

The measuring system described, in which the testing means according to the invention are so constructed that the voltage test can be performed even through the cell openings, does not make it possible to determine the location of a defective cell. Likewise, it is not possible to distinguish between a short-circuit and reversed polarity in a doubtful case. However, because the battery is unusable in any event and has to be rejected, it becomes possible to dispense with further fault diagnosis.

In case the testing is performed before applying the lid, which is appropriate from the manufacturing standpoint, additional information can be obtained by contacting test tips to the cell pole bridges.

By appropriate arrangement of an electrical test apparatus, in which the measuring instrument embodying the invention is integrated and which is programmable as to rejection criteria, the type and location of the defect can be ascertained and a mark which indicates this can even be applied.

We claim:

1. A method for testing lead storage batteries whose electrode plates have been charged but which are dry-storable by virtue of not yet having been filled with electrolyte, said method comprising
    establishing between one or more positive and negative electrodes in at least one of the cells, which cells together form a complete battery, a connection which is capable of providing only ion conduction between said connected electrodes, and
    applying a potential measuring instrument across the terminals of the connected electrodes,
    whereby the individual cells as well as the complete battery can be tested for polarity, short-circuit and open circuit.

2. The method of claim 1 wherein
    the said connection is established in each of the cells of the complete battery, and
    the measuring instrument is applied across the terminals of the complete battery.

3. A system for testing lead storage batteries whose electrode plates have been charged but which are dry-storable by virtue of not yet having been filled with electrolyte, said system comprising
    means for establishing between one or more positive and negative electrodes in each of the cells, which cells together form a complete battery, a connection which is capable of providing only ion conduction between said connected electrodes, and
    means for applying a potential measuring instrument across the terminals of the connected electrodes,
    said connection including an electrolyte-soaked material whose electrolyte provides ion conducting continuity, and having its ends respectively contacting said positive and negative plates,
    the electrolyte-soaked material taking the form of a brush-like structure whose bristles are capillaries, the upper ends of the capillaries extending into an electrolyte reservoir which interconnects the capillaries with each other,
    the lower ends touching positive and negative plates and thereby producing contact with them,
    whereby the battery can be tested for cell polarity, short-circuit and open circuit.

4. A system for practicing the method of claim 1 comprising
    an electrolyte-soaked material whose electrolyte provides the said ion conduction, and having its ends respectively contacting said positive and negative plates.

5. The system of claim 4 wherein the contacting is with the upper grid frame surfaces of the plates, whereby
    contact even though slight is provided with the electrode surfaces.

6. The system of claim 3, wherein the contacts of the lower ends of the bristles are with the upper grid frame surfaces of the plates.

* * * * *